Feb. 19, 1957  D. G. MAHONEY  2,781,952
MATERIAL HANDLING APPARATUS
Filed May 5, 1954  2 Sheets-Sheet 1
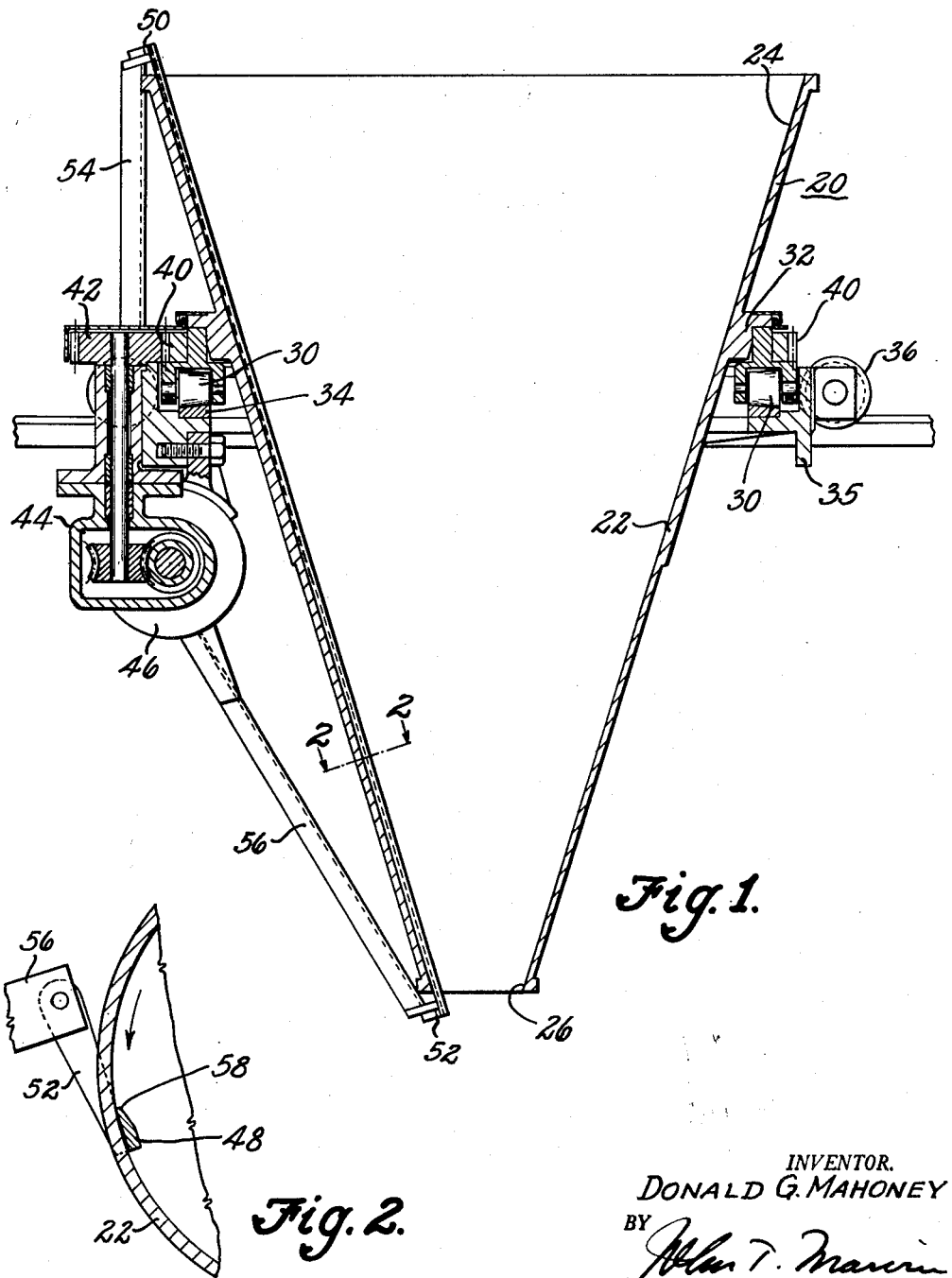
INVENTOR.
DONALD G. MAHONEY
BY
ATTORNEY

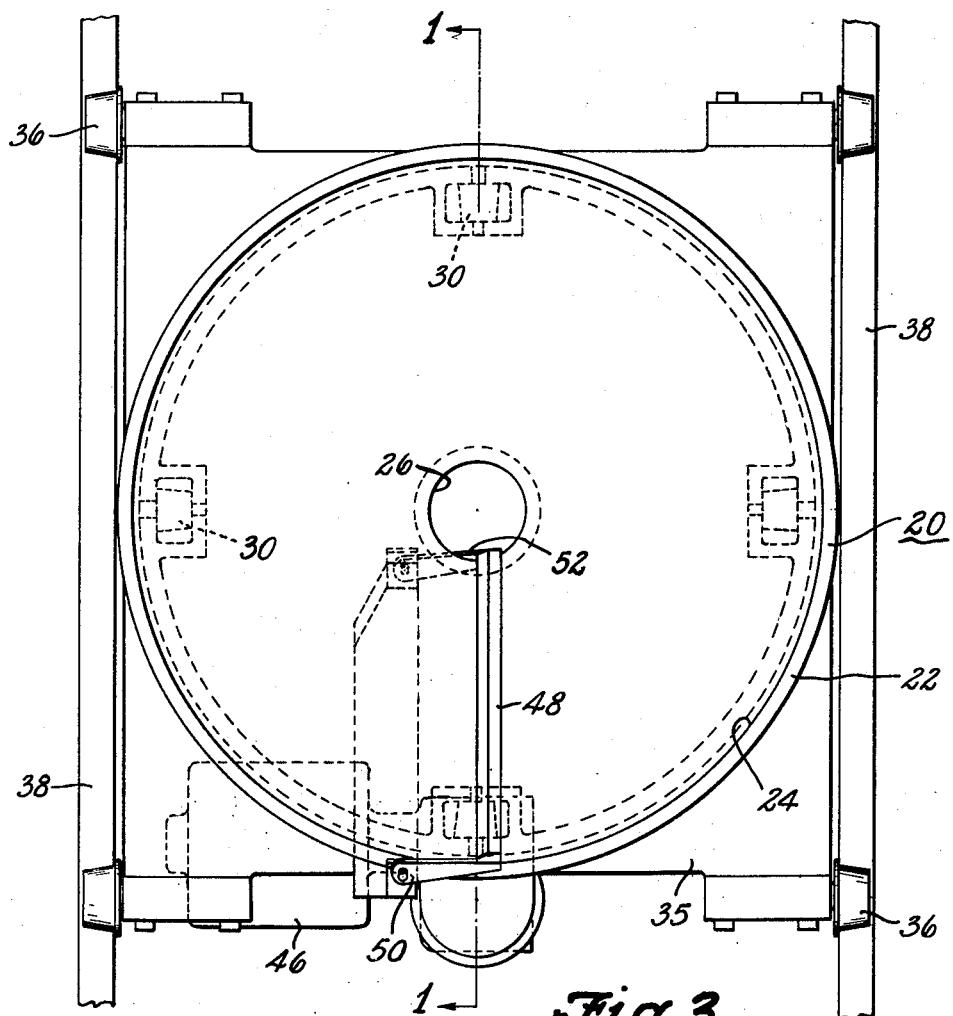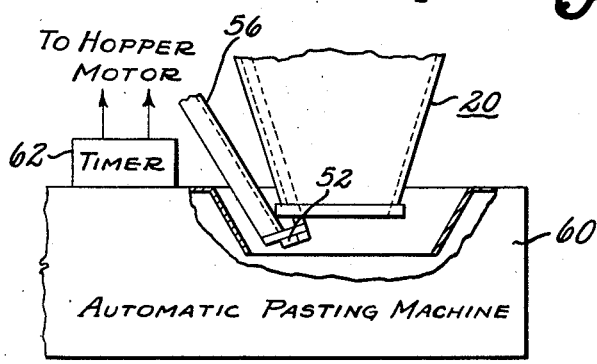

United States Patent Office 2,781,952
Patented Feb. 19, 1957

2,781,952
MATERIAL HANDLING APPARATUS

Donald G. Mahoney, Muncie, Ind., assignor to General Motors Corporation, Detroit, Mich., a corporation of Delaware Application May 5, 1954, Serial No. 427,827

8 Claims. (Cl. 222—168)

This invention relates to feeding devices and is particularly concerned with automatic delivery hoppers for use with heavy, sticky mixtures, such as, lead oxide paste and the like.

It is, therefore, the basic object of the invention to provide an automatic feeding hopper for thick, sticky mixtures of pasty material, such as, lead oxide mixtures used to paste battery grids and similar compounds.

In carrying out the above object, it is a further object to provide an open rotatable hopper of frustro conical shape which will feed the material therefrom through a bottom opening therein only when the hopper is being rotated and where the feeding of the material will cease when the hopper is stationary.

In carrying out the above object, it is still a further object to provide a floating blade for scraping the side of the hopper, which blade is held in engagement with the sloping sides of the hopper by the material contained therein due to the configuration of the blade.

A still further object of the invention is to provide a feeding device to be used in connection with automatic grid pasting machines of the type shown in Lund Patent No. 2,375,414.

Another object of the invention is to provide a truncated conical hopper open at both ends thereof wherein the hopper is positioned vertically with the smaller diameter end at the bottom thereof, said hopper being rotatably mounted upon a frame structure and including a scraper blade adapted to bear against the conical inner surface of the hopper, which blade is freely translatable and is hingedly mounted to the hopper at the adjacent ends thereof, means being provided for rotating the hopper relative to the frame structure.

Further objects and advantages of the present invention will be apparent from the following description, reference being had to the accompanying drawing, wherein preferred embodiments of the present invention are clearly shown.

In the drawing:

Fig. 1 is a view in section taken on the line 1—1 of Fig. 3, showing a preferred form of the feeding device and showing a portion only of the supporting frame structure.

Fig. 2 is a fragmentary view taken on line 2—2 of Fig. 1, showing the scraper blade in section on an enlarged scale.

Fig. 3 is a plan view of the feeding device structure.

Fig. 4 is a fragmentary diagrammatic view showing the disposition of a hopper with respect to the pasting machine.

In the manufacture of storage batteries, for example, the handling of the paste used in the grids thereof presents a major problem. This problem arises through the fact that the paste being a mixture of lead oxides with a liquid vehicle, such as, acid and water, is very heavy and thick and presents a sticky, non-flowable mass that cannot be easily conveyed or moved mechanically. In modern manufacturing procedures, the storage battery grids are pasted with this material in automatic grid pasting machines which require a supply of the grid paste material which must be maintained therein in order for the machine to function continuously. In the past, due to the consistency and difficulty of handling the grid paste material, this has been mixed in standard mixers and then conveyed by carts to the grid pasting machine where it is fed into the grid pasting machine manually. This type of supply is not satisfactory and brings the human element into the process which frequently requires shutting down of the grid pasting machine, etc.

It is highly desirable, therefore, to provide automatic means for feeding the grid pasting machine, wherein the feeding is controlled in accordance with the number of grids being pasted so that there is always a proper supply of grid paste in the machine.

The present invention is directed to such a source of supply in that a feeding device is provided which consists of a truncated conical hopper set vertically above the grid pasting machine, which feeding device is open at both ends with the small diameter open end being at the bottom thereof. A mixture of grid paste is supplied to the hopper of the feeding device and, due to its consistency, will not flow out of the open end thereof when the truncated conical hopper is stationary. This is due to the fact that the grid paste is heavy and thick and packs into the hopper due to its conical shape and will not flow therefrom. However, when the hopper is rotated and the side walls thereof are scraped by means of a scraping blade, the grid paste flows freely out of the lower open end thereof into the grid pasting machine. Immediately upon cessation of rotation of the hopper, the flow of paste therefrom stops. Thus, the hopper may be automatically interlocked with the grid pasting machine to constantly supply sufficient paste for operations of the machine as will be explained thereinafter.

Referring to the drawing, and particularly to Fig. 1, a sectional view of a feeding device 20 is shown which includes a truncated conical hopper 22 having a large opening 24 at the top thereof and a small opening 26 at the lower end thereof. The hopper 22 is maintained in a vertical position by means of supporting rollers 30 positioned around a reinforcing ring 32 suitably attached around the upper end of the hopper 22. The rollers 30 ride on a rotary track 34 which is supported upon a frame 35 which in turn is supported on rollers 36. The rollers 36 are movable upon a tracklike structure 38 so that the entire feeding device 20 can be translated from one position to another upon track 38 to facilitate loading, etc. Normally, however, hopper 22 is held in one position upon the track 38 above the pasting machine.

The reinforcing ring 32 includes a ring gear 40 therearound which engages a gear 42 attached to a speed reducing mechanism 44 driven by a motor 46 which is carried and supported by frame 35. Thus, when the motor 46 is in operation, the hopper 22 is rotated upon the rollers 30 and track 34 through the gear reducer 44, gear 42 and ring gear 40.

Within the hopper 22 is a scraping blade 48 which is hingedly mounted at both ends thereof, for example, at 50 and 52. The hinges 50 and 52 are suitably supported by struts 54 and 56 which may be attached to the speed reducer housing or to the frame 35. The blade 48 is freely translatable within the hopper 22 through its hinged connection and can be swung away from the wall of the hopper and is stationary with respect to the rotation of the hopper.

Referring to Fig. 2, the cross section of the blade, which is formed in a knife edge at the front portion 58 thereof, is clearly shown. As the hopper 22, containing paste, is rotated in the direction of the arrow shown in Fig. 2, the blade 48 is normally forced into scraping relation with the sloping side of the hopper due to the weight of the paste and configuration of the blade 48. The blade, which is hinged and therefore is freely translatable, normally scrapes the side of the hopper unless some impediment is present, in which case, the blade may hinge outwardly to prevent damage thereto.

In the use of the device 20, the hopper 22 is placed with its lower end directly over the feeding entrance of an automatic pasting machine 60 as noted in Fig. 4. This pasting machine has suitable means for moving the paste into the pasting operation. The machine 60 may include a timer 62 which periodically energizes the motor 46 to cause the hopper 22 to turn whereby paste is fed to the pasting machine. When the timer breaks the circuit, the motor 46 stops and the hopper also ceases to rotate whereupon the flow of paste is stopped. Thus, by intermittent and periodic operation of the hopper through the timer or other suitable automatic control, a suitable supply of paste is maintained at all times in the pasting machine to take care of the pasting operation.

The hopper 22 is suitable in size to carry a substantial amount of paste so that filling operations of the hopper are infrequent. In the present application of the device, the hoppers are in the order of 5' high with an upper diameter of about 3½' and a lower opening of about 6" in diameter. The hopper of these dimensions is rotated at a speed in the order of 6 R. P. M. to cause the feeding operation to take place and to supply the desired rate of feed, although here again, any rotation of the hopper causes a flow of the paste therefrom whereas when the hopper is stationary, there is no tendency for the paste to move therein. If the slope of the side wall of the hopper is changed, the rate of feed can be maintained constant by increasing the speed of rotation for greater slopes (larger angles measured from the vertical axis) and lowering down the speed of rotation for lesser slopes (smaller angles measured from the vertical axis). Obviously, in the case of any given slope, the rate of feed can be varied by increasing the speed of rotation for increased feeds and reducing the speed of rotation for reduced feeds. In all cases the capacity of the hopper can be varied as desired. Seabury, et al. Patent No. 2,347,131 and Hindall Patent No. 2,481,218 discuss typical examples of storage battery grid pastes and methods of preparing and mixing said pastes.

While the embodiments of the present invention as herein disclosed, constitute preferred forms, it is to be understood that other forms might be adopted.

What is claimed is as follows:

1. A feeding device for lead oxide paste and the like, comprising in combination, a vertically disposed hopper of generally truncated conical shape having fully open ends with the smaller diameter opening disposed adjacent the bottom of the hopper, support means for rotatably supporting the hopper, a stationary scraper blade disposed in scraping relation to the internal side of the hopper and extending the entire length thereof and means for rotating the hopper.

2. A feeding device for lead oxide paste and the like, comprising in combination, a vertically disposed hopper of generally truncated conical shape having fully open ends with the smaller diameter opening disposed adjacent the bottom of the hopper, support means for rotatably supporting the hopper, a hingedly mounted scraper extending the entire length of said hopper and disposed in scraping relation to the internal wall of said hopper, said scraper comprising a blade having a knife edge longitudinally thereof which is directed in opposition to the direction of rotation of said hopper whereby paste in said hopper forces the blade into contact therewith during rotation of the hopper, and means for rotating the hopper.

3. A feeding device for lead oxide paste and the like, comprising in combination, a vertically disposed hopper of generally truncated conical shape having fully open ends with the smaller diameter opening disposed adjacent the bottom of the hopper, support means for rotatably supporting the hopper, a hingedly mounted scraper blade extending the entire length of said hopper and disposed in scraping relation to the internal wall of said hopper, said blade being hingedly supported at opposite ends thereof so as to be swingable within said hopper whereby the blade contacts the wall of the hopper during rotation thereof, and means for rotating the hopper.

4. A feeding device for lead oxide paste and the like, comprising in combination, a vertically disposed hopper of generally truncated conical shape having fully open ends with the smaller diameter opening disposed adjacent the bottom of the hopper, supporting means for supporting the hopper, said supporting means being translatable together with the hopper from one position to another position, a scraper blade disposed within the hopper in scraping relation to the internal surface thereof, hinge means at opposite ends of said blade carried by said supporting means, a ring gear disposed at the external surface of said hopper, a driving gear in driving relation to said ring gear and means for rotating said driving gear for rotating the hopper, said last named means being carried by said supporting means.

5. A material handling and delivery device for use with pasty substances, comprising in combination, a rotatable generally vertically disposed hopper fully open at both ends, a support for said hopper, means associated with said support for permitting rotation of said hopper with respect thereto, driving means associated with said support and adapted to rotate said hopper, a scraper blade within said hopper and extending the full length thereof and adapted to engage the inner wall thereof, said blade being mounted so as to be relatively movable with respect to said hopper when said hopper is being rotated.

6. A material handling and delivery device for use with pasty substances, comprising in combination, a generally vertically disposed truncated conical hopper fully open at both ends with the smaller diameter opening adjacent the bottom thereof, a support for said hopper, a scraper blade disposed within said hopper extending the entire length thereof and adapted to engage the inner wall thereof and means for causing relative movement between the blade and the hopper, said means including a motor carried by said support.

7. A feeding device for lead oxide paste and the like, comprising in combination, a vertically disposed hopper of generally truncated conical shape having fully open ends with the smaller diameter opening being disposed adjacent the bottom of the hopper, support means for supporting the hopper, a scraper blade disposed in scraping relation to the internal side of said hopper and extending the entire length of said hopper, said blade and said hopper being relatively movable with respect to one another, and means for causing relative movement between said blade and said hopper.

8. A feeding device for lead oxide paste and the like, comprising in combination, a vertically disposed hopper of generally truncated conical shape having fully open ends with the smaller diameter opening disposed adjacent the bottom of the hopper, support means for supporting the hopper, a hinged scraper disposed in scraping relation to the internal wall of the hopper and extending the entire length of said hopper, said scraper comprising a blade having a knife edge extending longitudinally thereof, said blade being relatively rotatable with respect to said hopper, and means for causing relative rotation between said hopper and said scraper.

References Cited in the file of this patent

UNITED STATES PATENTS

| | | |
|---|---|---|
| 354,940 | Sharpneck | Dec. 28, 1886 |
| 389,456 | Gibson | Sept. 11, 1888 |
| 2,195,133 | Nevin | Mar. 26, 1940 |
| 2,255,325 | Mills | Sept 9, 1941 |
| 2,591,785 | Crawford et al. | Apr. 8, 1952 |
| 2,606,693 | Phillips | Aug. 12, 1952 |